United States Patent
Borshov et al.

(10) Patent No.: US 9,313,953 B2
(45) Date of Patent: Apr. 19, 2016

(54) PARKING BRAKE SYSTEM FOR A LAP BAR CONTROLLED ZERO TURN RADIUS MOWER

(71) Applicant: MTD PRODUCTS INC, Valley City, OH (US)

(72) Inventors: Alex Borshov, Valley City, OH (US); Adam Woodrum, Oberlin, OH (US)

(73) Assignee: MTD PRODUCTS INC, Valley City, OH (US)

( * ) Notice: Subject to any disclaimer, the term of this patent is extended or adjusted under 35 U.S.C. 154(b) by 27 days.

(21) Appl. No.: 14/197,750

(22) Filed: Mar. 5, 2014

(65) Prior Publication Data

US 2014/0262630 A1 Sep. 18, 2014

Related U.S. Application Data

(60) Provisional application No. 61/787,276, filed on Mar. 15, 2013.

(51) Int. Cl.
| | |
|---|---|
| *A01D 69/10* | (2006.01) |
| *B60T 7/10* | (2006.01) |
| *B60T 11/21* | (2006.01) |
| *B60T 1/00* | (2006.01) |
| *B60T 11/04* | (2006.01) |
| *F16D 63/00* | (2006.01) |

(52) U.S. Cl.
CPC ................ *A01D 69/10* (2013.01); *B60T 1/005* (2013.01); *B60T 7/102* (2013.01); *B60T 7/104* (2013.01); *B60T 11/04* (2013.01); *B60T 11/21* (2013.01); *F16D 63/006* (2013.01)

(58) Field of Classification Search
CPC . A01D 69/101; A01D 34/64; A01D 2101/00; F16D 2125/62; F16D 63/006; B60T 7/102; B60T 1/062; B60T 11/046
USPC .......................... 188/16, 19, 20, 2 D; 56/11.3
See application file for complete search history.

(56) References Cited

U.S. PATENT DOCUMENTS

| | | | |
|---|---|---|---|
| 1,403,258 | A | 1/1922 | Lewis |
| 1,906,428 | A | 5/1933 | Snow, Jr. |

(Continued)

FOREIGN PATENT DOCUMENTS

| | | |
|---|---|---|
| EP | 1724498 | 11/2006 |
| EP | 2025216 | 2/2009 |

(Continued)

OTHER PUBLICATIONS

International Search Report and Written Opinion dated Jun. 17 2014 for corresponding patent application No. PCT/US/2014/020643 filed Mar. 5, 2014.

*Primary Examiner* — Xuan Lan Nguyen
(74) *Attorney, Agent, or Firm* — Benjamin Cotton; Jason Worgull; Charles Hayes

(57) ABSTRACT

The parking brake system for a lap bar controlled lawn maintenance vehicle includes at least an actuation assembly and a stop assembly. The actuation assembly includes a push arm and a rotatable pedal arm, and the push arm is attached to a lap bar and is rotatable between and engaged position and a disengaged position. Rotation of the push arm from the disengaged position to the engaged position causes rotation of the pedal arm, and such rotation of the pedal arm causes the stop assembly to prevent the axle for the rear wheel that is controlled by the corresponding lap bar from rotating.

12 Claims, 4 Drawing Sheets

(56) References Cited

U.S. PATENT DOCUMENTS

| | | |
|---|---|---|
| 2,692,514 A | 10/1954 | O'Leary |
| 3,877,537 A | 4/1975 | Ohms et al. |
| 4,088,209 A | 5/1978 | Drone |
| 4,124,084 A | 11/1978 | Albright et al. |
| 4,168,757 A | 9/1979 | Mather et al. |
| 4,372,408 A | 2/1983 | Chatterjea |
| 4,558,558 A | 12/1985 | Horner, Jr. et al. |
| 4,702,330 A | 10/1987 | Vatter et al. |
| 4,914,894 A | 4/1990 | Geiger |
| 4,949,823 A | 8/1990 | Coutant et al. |
| 5,197,577 A | 3/1993 | Hayek |
| 5,427,217 A | 6/1995 | Patridge |
| 5,517,809 A | 5/1996 | Rich |
| 5,644,903 A | 7/1997 | Davis, Jr. |
| 5,913,802 A | 6/1999 | Mullet et al. |
| 5,918,691 A | 7/1999 | Ishii |
| 5,946,894 A | 9/1999 | Eavenson et al. |
| 6,070,690 A | 6/2000 | Eavenson et al. |
| 6,205,753 B1 | 3/2001 | Velke et al. |
| 6,301,864 B1 | 10/2001 | Damie et al. |
| 6,434,917 B1 | 8/2002 | Bartel |
| 6,487,857 B1 | 12/2002 | Poplawski et al. |
| 6,530,442 B1 | 3/2003 | Satzler |
| 6,631,607 B1 | 10/2003 | Kaesgen |
| 6,729,115 B2 | 5/2004 | Bartel |
| 6,739,116 B2 | 5/2004 | Stover et al. |
| 6,827,174 B2 | 12/2004 | Chernoff et al. |
| 6,898,496 B2 | 5/2005 | Chernoff et al. |
| 7,017,327 B2 | 3/2006 | Hunt et al. |
| 7,299,610 B2 | 11/2007 | Piontek |
| 7,302,789 B2 | 12/2007 | Eavenson, Sr. et al. |
| 7,328,576 B1 | 2/2008 | Langenfeld et al. |
| 7,340,890 B1 | 3/2008 | Poplawski et al. |
| 7,430,847 B2 | 10/2008 | Hoffman et al. |
| 7,451,865 B2 | 11/2008 | Eavenson, Sr. et al. |
| 7,596,934 B2 | 10/2009 | Waesche et al. |
| 7,634,953 B2 | 12/2009 | Hoffman et al. |
| 7,669,873 B1 | 3/2010 | Papke et al. |
| 7,677,371 B2 | 3/2010 | Dong et al. |
| 7,686,108 B2 | 3/2010 | Piontek |
| 7,708,091 B2 | 5/2010 | Osborne |
| 7,712,294 B2 | 5/2010 | Wright et al. |
| 7,744,168 B2 | 6/2010 | Eberling et al. |
| 7,798,259 B2 | 9/2010 | Iida et al. |
| 7,857,089 B1 | 12/2010 | Sugden et al. |
| 7,942,224 B2 | 5/2011 | Marshall et al. |
| 7,954,573 B2 | 6/2011 | Jessen |
| 7,975,459 B1 | 7/2011 | Murawski |
| 2004/0074692 A1 | 4/2004 | Rupiper et al. |
| 2007/0163221 A1 | 7/2007 | Foster |
| 2007/0187157 A1 | 8/2007 | Hurley |
| 2008/0072556 A1 | 3/2008 | Tegtmeier et al. |
| 2008/0296107 A1 | 12/2008 | Porter et al. |
| 2009/0044506 A1* | 2/2009 | Nunez et al. .................. 56/11.3 |
| 2009/0079254 A1 | 3/2009 | Jacobs |
| 2011/0127093 A1 | 6/2011 | Koga et al. |

FOREIGN PATENT DOCUMENTS

| | | |
|---|---|---|
| GB | 1391252 | 4/1975 |
| GB | 1437299 | 5/1976 |
| GB | 1564426 | 4/1980 |
| JP | 1172024 | 7/1989 |
| JP | 2001063535 | 3/2001 |
| JP | 2001063536 | 3/2001 |
| WO | 2011029864 | 3/2011 |

* cited by examiner

PARKING BRAKE SYSTEM FOR A LAP BAR CONTROLLED ZERO TURN RADIUS MOWER

FIELD OF THE INVENTION

The present invention is directed to a zero turn radius lawn mower controlled by a pair of lap bars, and more particularly, to the parking brake system for a lap bar controlled zero turn radius mower.

BACKGROUND OF THE INVENTION

It is known in the art to provide vehicles such as lawnmowers with drive systems that provide for Zero Turn Radius (ZTR) steering. ZTR vehicles typically have two drive wheels that can be rotated at different speeds to achieve turning. The drive wheels can also be rotated in different directions for a very sharp turn or even a zero turn radius which is when the mower actually turns about the mid point of the drive wheel axis. The other wheels on the mower are castered and merely follow the drive wheels.

ZTR vehicles are typically controlled by a pair of side-by-side speed control levers that are independently operated for use in steering and propelling the vehicle. The speed control levers move forward and aft from a neutral position to achieve variable speed and steering. These two essentially vertically positioned levers can be positioned close together between the operator's knees or positioned out to the sides of the operator with horizontal gripping portions extending in toward the center of the mower for easy side-by-side gripping. Each of the dual speed control levers are connected to a respective drive device, such as a hydrostatic drive, that are, in turn, connected to the drive wheels for use in propelling and steering the vehicle. The hydrostatic drive typically includes a variable displacement axial piston hydraulic pump for each of the two fixed axle drive wheels. Each speed control lever independently controls the speed of one of the drive wheels which permits a variety of maneuvers including rotating one wheel forward while rotating the other backward, which causes the mower to turn within its own dimensions. With ZTR steering, the vehicle becomes much more maneuverable than conventional vehicle steering.

ZTR vehicles typically require means to prevent starting the machine unless the control levers are in their neutral positions. This is typically accomplished by sensing the position of the speed control levers and disabling the starting control power circuit unless the speed control levers are in their neutral position. Thus, the operator is typically required to place the speed control levers into slotted sections corresponding to the neutral position of the levers to activate the neutral position switches.

BRIEF SUMMARY OF THE INVENTION

In one aspect of the present invention, a parking brake system for a lawn maintenance vehicle is provided. The lawn maintenance vehicle includes a pair of opposing lap bars for independently controlling movement of a pair of rear wheels. The said parking brake system includes an actuation assembly attached to one of the lap bars. The actuation assembly includes a rotatable push arm and a rotatable pedal arm, wherein the push arm is spaced apart from the pedal arm when the push arm is in a disengaged position and the push arm is in contact with the pedal arm when the push arm is in an engaged position. The parking brake system also includes a stop assembly operatively connected to the actuation assembly. The stop assembly including a rotatable pawl selectively engageable with a parking gear. The parking gear is operatively connected to an axle to which one of the rear wheels is attached for selectively stopping rotation of the axle. Rotation of the push arm from the disengaged position to the engaged position causes the push arm to contact the pedal arm, wherein the pedal arm is rotated in response to the contact with the push arm and such rotation of the pedal arm causes the pawl of the stop assembly to engage the parking gear which prevents rotation of the axle.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
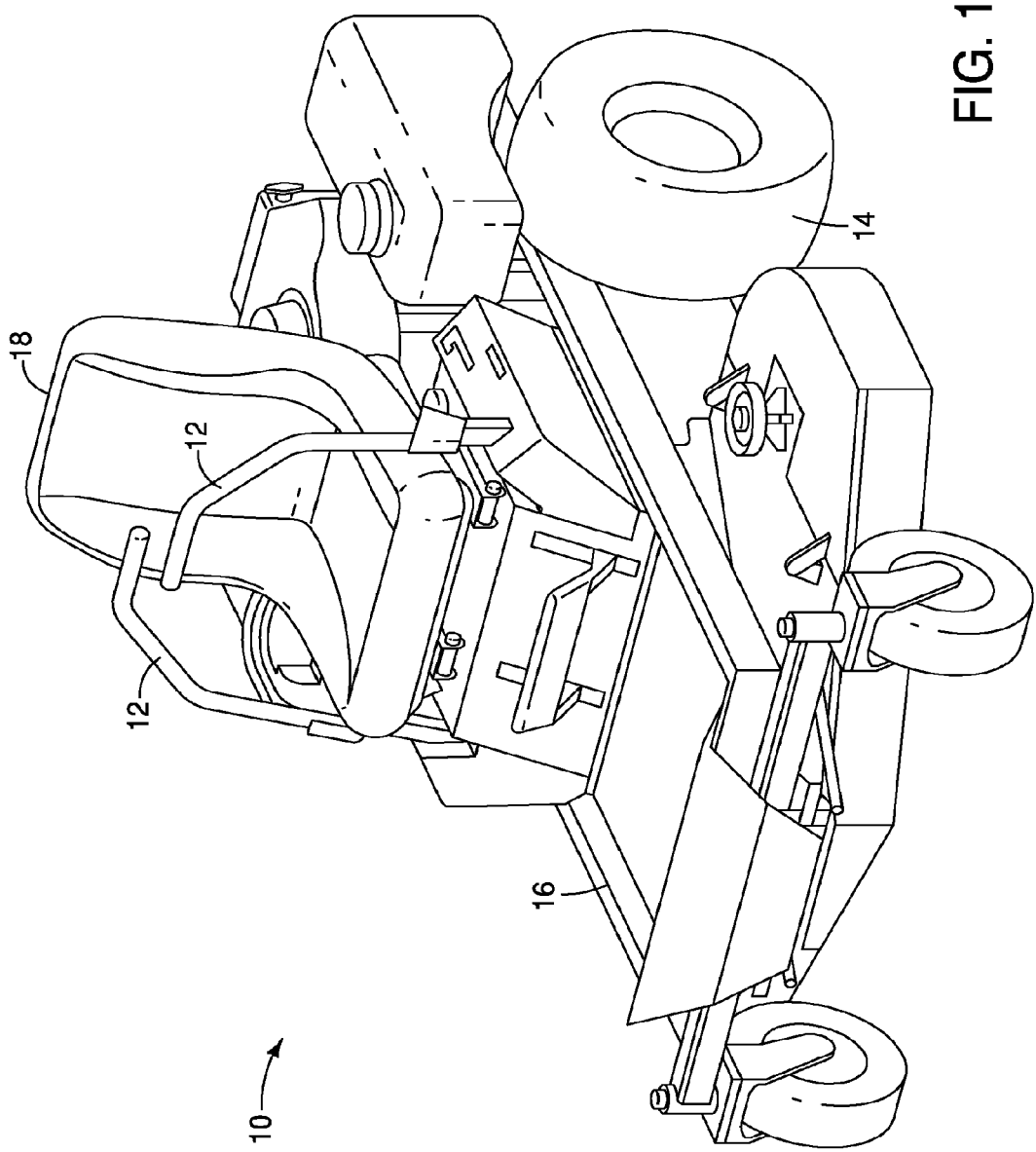
FIG. 1 is a perspective view of an exemplary lawn maintenance vehicle having lap bar controls.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Referring to FIG. 1, a lawn maintenance vehicle 10 having a pair of opposing lap bars 12, wherein each lap bar 12 independently controls the forward and rearward rotation of a corresponding rear wheel 14 for steering the lawn maintenance vehicle 10, is shown. The lap bars 12 are both laterally and fore/aft movable relative to the frame 16 of the lawn maintenance vehicle 10. The fore/aft movement of the lap bars 12 controls the forward and rearward movement of the rear wheels 14. The lap bars 12 are laterally movable between a steerable position in which the lap bars 12 are rotated toward a seated user such that the lap bars 12 are movable in the fore/aft direction once the lap bars 12 are moved to the steerable position, and the lap bars 12 are movable toward an neutral position in which the lap bars 12 are rotated laterally outward away from each other and away from the seated user to allow the seated user added space between the lap bars 12 to stand up and neutral the seat 18. When the lap bars 12 are moved to the neutral position, a pair of parking brake system 20 (FIGS. 2-5) are actuated to cause a brake assembly to become engaged to prevent the lawn maintenance vehicle 10 from moving while the user neutrals, and when the lap bars 12 are moved to the steerable position, the parking brake system 20 is disengaged so as to allow the lawn maintenance vehicle 10 to move forward and backward in response to the fore/aft movement of the lap bars 12. In an embodiment, each of the lap bars 12 is operatively connected to a brake assembly such that laterally outward movement of either of the lap bars 12 causes the respective brake assembly to become engaged. In another embodiment, the brake assemblies only become engaged when both of the lap bars 12 are moved into the neutral position.

Figure 2:
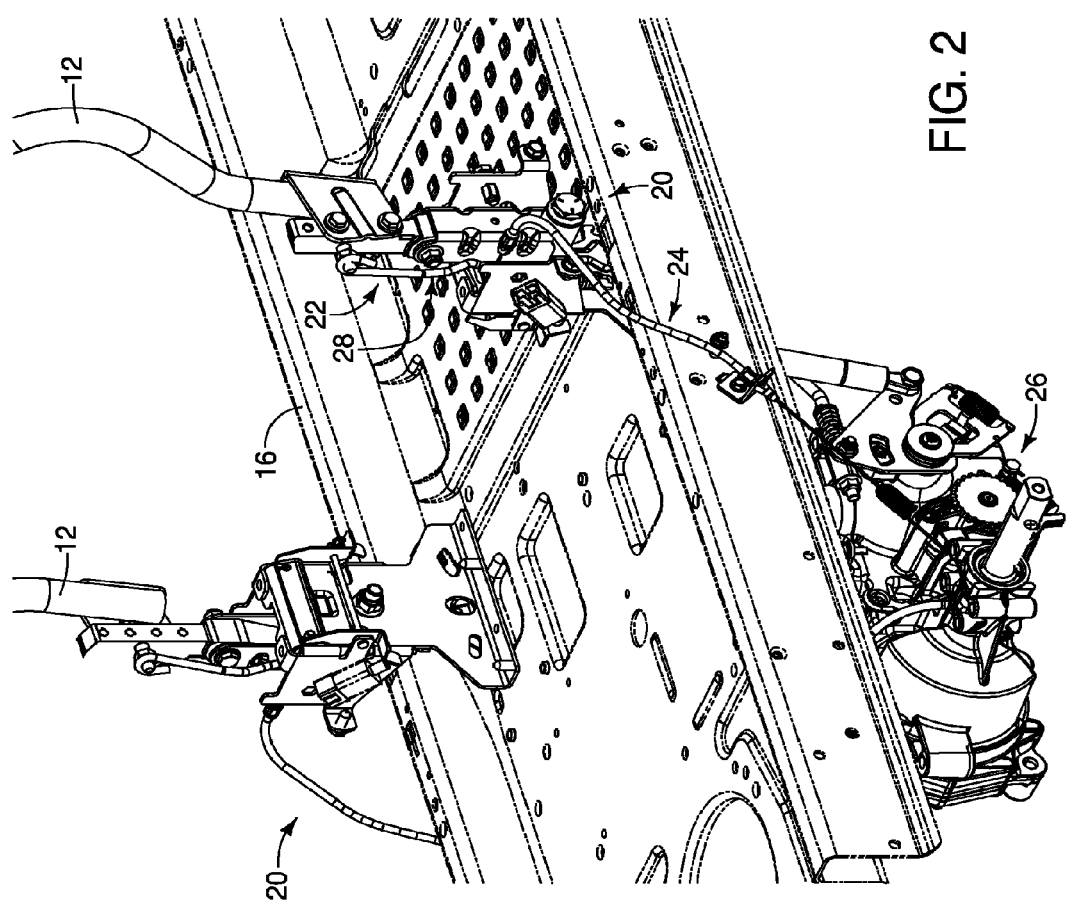
FIG. 2 is a magnified view of the frame of the lawn maintenance vehicle with opposing parking brake assemblies.

As shown in FIG. 2, each of the lap bars 12 is operatively connected to a separate parking brake system 20 such that lateral movement of either of the lap bars 12 causes the corresponding parking brake system 20 to become engaged to prevent the corresponding rear wheel 14 (FIG. 1) from rotating. The parking brake assemblies 20 are attached to opposite sides of the frame 16. Each parking brake system 20 includes an actuation assembly 22, a transfer assembly 24, a stop assembly 26, and a return assembly 28. A lap bar 12 is attached to the actuation assembly 22 which moves in a corresponding manner with the lap bar 12, wherein movement of a lap bar 12 to the neutral position causes the corresponding movement of the actuation assembly 22 to be transferred to the stop assembly 26 by way of the transfer assembly 24, and the return assembly 28 causes the reverse movement of the stop assembly 26 and transfer assembly 24 when the lap bar 12 is moved to a steerable position in which the actuation assembly 22 likewise moves in a corresponding manner.

Figure 3:
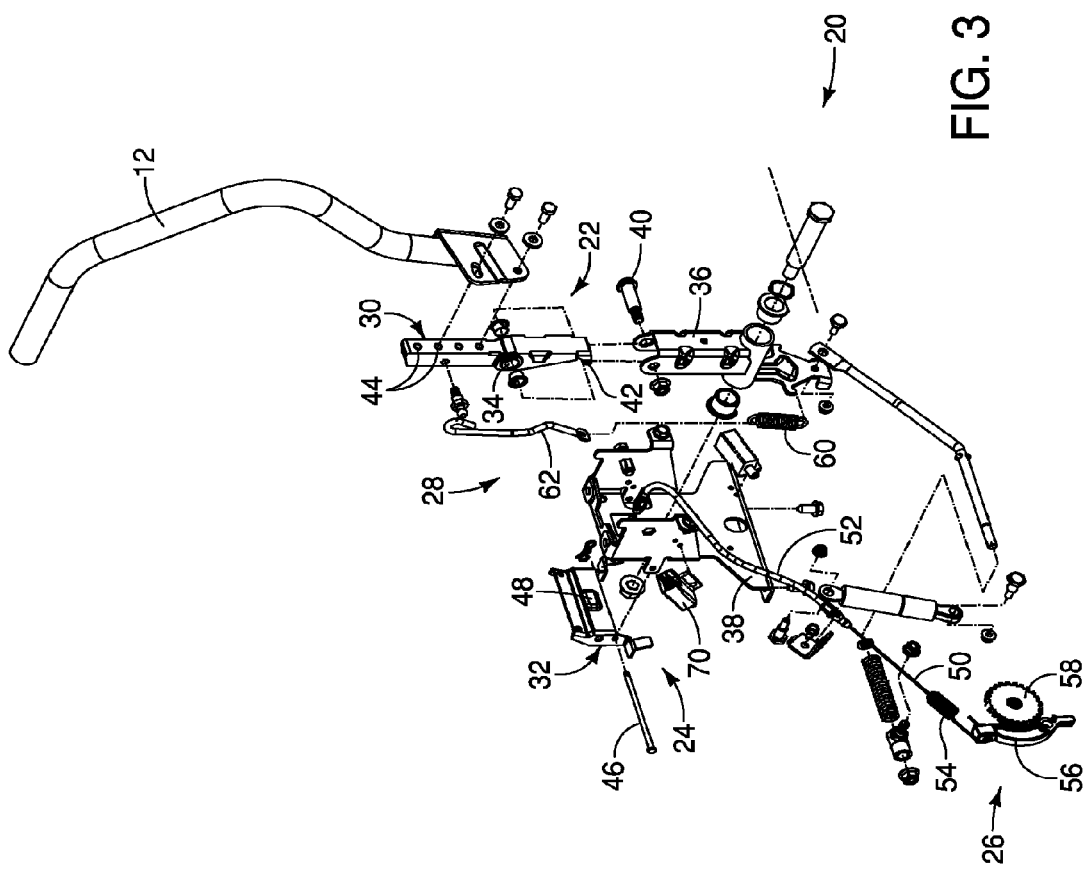
FIG. 3 is an exploded view of an exemplary parking brake assembly.

In an embodiment, the actuation assembly 22 includes a rotatable push arm 30 and a rotatable pedal lever 32, as illustrated in FIG. 3. The push arm 30 is an elongated member, or lever, having an upper end and a lower end, wherein the upper and lower ends are separated by a first pivot aperture 34. The push arm 30 and lap bar 12 attached thereto are laterally rotatable about the first pivot aperture 34, which forms a first pivot axis. The push arm 30 is rotatably connected to the frame 16 (FIG. 1) by way of first bracket 36 that is rotatably attached to a securing bracket 38, wherein a first pin 40 allows the push arm 30 to rotate relative to the first bracket 36. The securing bracket 38 is fixedly attached to the frame 16. When the lap bar 12 rotates laterally outward to the neutral position, the upper end of the push arm 30 similarly rotates laterally outward and the lower end of the push arm 30 rotates laterally inward. The push arm 30 includes a plurality of apertures 44 formed through the upper end of the push arm 30. The apertures 44 allow the lap bar 12 to be attached to the push arm 30 at different vertical positions relative to the push arm 30, thereby allowing the lap bar 12 to be vertically adjustable relative to a seated user. The push arm 30 also includes a projection 42 positioned at or adjacent to the lower end. The projection 42 extends inwardly from the push arm 30 and toward the opposing parking brake system 20 such that when the upper end of the push arm 30 is rotated laterally outwardly to the neutral position of the lap bar 12, the lower end of the push arm 30 and the projection 42 rotate inwardly. In a similar manner, when the upper end of the push arm 30 is rotated laterally inwardly to the steerable position of the lap bar 12, the lower end of the push arm 30 and the projection 42 rotate outwardly. Laterally outward rotation of the upper end of the push arm 30 and the corresponding laterally inward rotation of the lower end of the push arm 30 causes the projection 42 to move inwardly into contact with the pedal arm 32.

Figure 4:
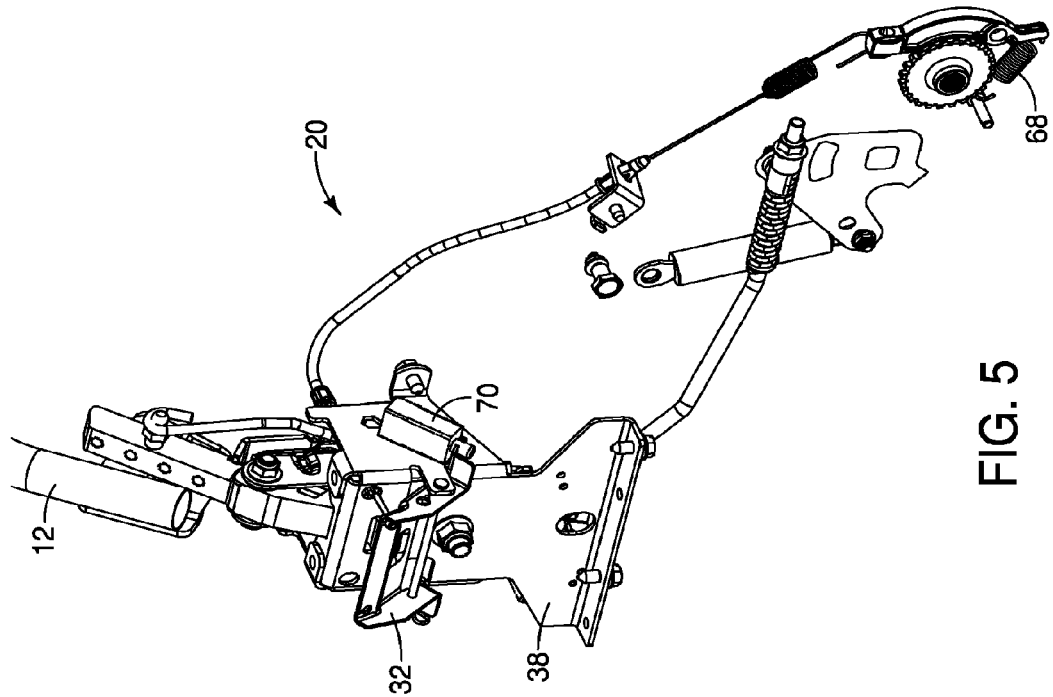
FIG. 4 is a magnified view of a parking brake assembly in a disengaged position.
Figure 5:
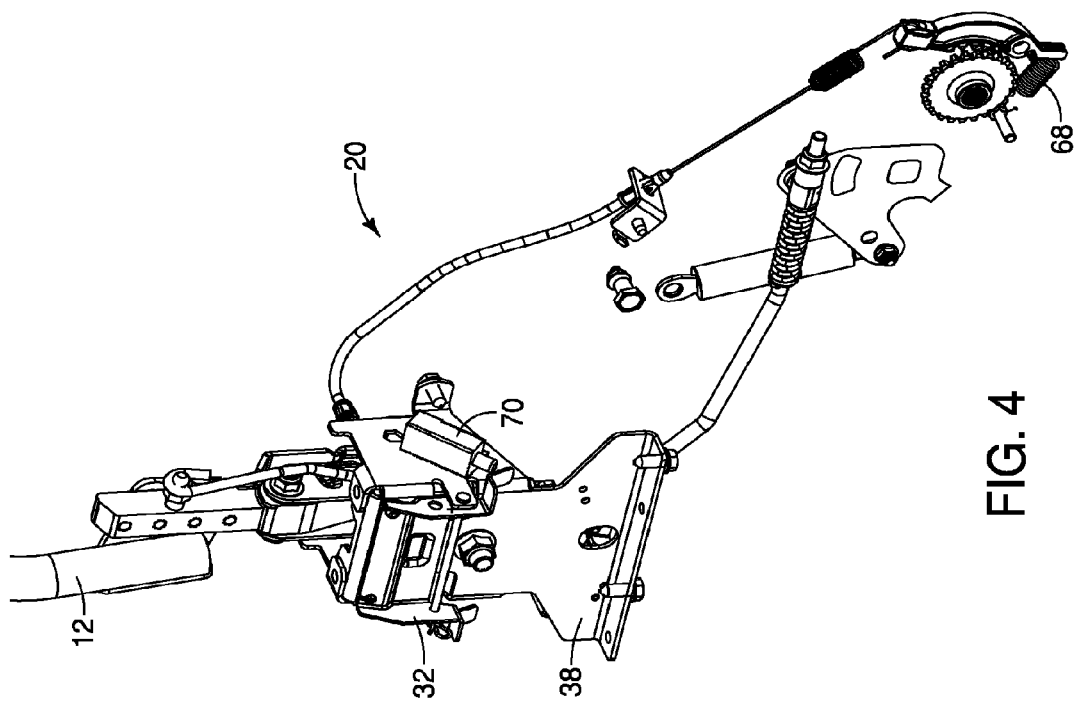
FIG. 5 is a magnified view of a parking brake assembly in an engaged position.

In an embodiment, the actuation assembly 22 of the parking brake system 20 also includes a pedal arm 32 that is rotatably connected to the securing bracket 38, as shown in FIG. 3. A second pin 46 is used to attach the pedal arm 32 to the securing bracket 38, thereby providing a pivot axis about which the pedal arm 32 rotates relative to the securing bracket 38. The pedal arm 32 includes a pad 48 extending outwardly therefrom, wherein the pad 48 extends from the pedal arm 32 toward the push arm 30. The pad 48 is configured to be contacted by the projection 42 of the push arm 30 when the lap bar 12 is rotated toward the neutral position. The pedal arm 32 is rotatable between a disengaged position and an engaged position, wherein the pedal arm 32 is oriented in a substantially vertical manner in the disengaged position and is oriented in a non-vertical manner in the engaged position, as shown in FIGS. 4-5 and explained below. The rotation of the pedal arm 32 between the disengaged position to the engaged position is caused by the contact with and lateral movement of the projection of the push arm 30, and rotation of the pedal arm 32 between the engaged position to the disengaged position is caused by the return assembly 28 which biases the pedal arm 32 toward the disengaged position. In an embodiment, the push arm 30 and the pedal arm 32 are in a spaced-apart relationship when the lap bar 12 is rotated laterally outward and in the neutral position, and the push arm 30 and the pedal arm 32 are in contact when the lap bar 12 is rotated laterally inward and in the steerable position. In another embodiment, the push arm 30 and pedal arm 32 are in continuous contact. A protective layer (not shown), may be attached to either or both the projection 42 of the push arm 30 and the pad 48 of the pedal arm 32. The rotation of the pedal arm 32 is input into the transfer assembly 24, which is configured to transfer such rotational movement into actuation of the stop assembly 26.

In an embodiment, the transfer assembly 24 includes a guide wire 50 positioned within a sheath 52 and a first spring 54, as shown in FIG. 3. One end of the guide wire 50 is operatively connected to the pedal arm 32, and the opposite end of the guide wire 50 is operatively connected to the first spring 54. The guide wire 50 is configured to slide within the sheath 52 in response to the rotational movement of the pedal arm 32. In another embodiment, the transfer assembly 24 includes only the guide wire 50 extending between the pedal arm 32 and the stop assembly 26 and positioned within the sheath 52, without a first spring 54 extending between the guide wire 50 and the stop assembly 26.

In an embodiment, the first spring 54 of the transfer assembly 24 is a tension spring that extends between the end of the guide wire 50 and the stop assembly 26, as shown in FIG. 3. The first spring 54 is configured to bias the guide wire 50 toward the first spring 54, thereby pulling or otherwise biasing the pedal arm 32 into the disengaged, or substantially vertical position. The spring constant of the first spring 54 should be sufficient to actuate the stop assembly 26 when the pedal arm 32 is rotated from the disengaged position to the engaged position while also being capable of biasing the pedal arm 32 into the disengaged position when the lap bar 12 and push arm 30 are rotated into the steerable position.

As shown in FIG. 3, the stop assembly 26 includes a pawl 56, a parking gear 58, and a third spring (FIGS. 4-5) wherein the pawl 56 is positioned immediately adjacent to the parking gear 58. The pawl 56 is an elongated, partially arcuate member in which one end of the pawl 56 is attached to the first spring 54 of the transfer assembly 24. The other end of the pawl 56 is rotatably secured so as to provide an axis of rotation to allow the pawl 56 to be selectively rotatable between a disengaged position and an engaged position. The pawl 56 is engageable with the parking gear 58 when the pawl 56 is in the engaged position, and the pawl 56 is disengaged from the parking gear 55 when the pawl 56 is in the disengaged position. The pawl 56 includes a plurality of teeth directed toward the parking gear 58.

In an embodiment, the parking gear 58 of the stop assembly 26 is a circular plate having a plurality of teeth extending radially outward from the outer circumferential edge, as shown in FIG. 3. The teeth of the parking gear 58 are selectively engageable with the teeth of the pawl 56 so as to prevent or stop rotation of parking gear 58. The parking gear is operatively connected to the drive shaft (not shown) to which a rear wheel 14 is attached such that when the rotation of the parking gear 58 is stopped through engagement with the pawl 56, the corresponding rear wheel 14 is likewise stopped.

The third spring 68 is attached to the lower end of the pawl 56 opposite the end of the pawl 56 to which the first spring 54 is attached, as shown in FIGS. 4-5. The third spring 68 is a tension spring configured to bias the pawl 56 into a disengaged position relative to the parking gear 58. The third spring 68 continuously pulls on the lower end of the pawl 56, thereby biasing the upper end of the pawl 56 away from the parking gear 58.

In an embodiment, the return assembly 28 includes a second spring 60 and a return bar 62, as shown in FIG. 3. The second spring 60 is a tension spring and extends between the first bracket 36 and the return bar 62. The return bar 62 is an elongated member having a hook at one distal end thereof and an aperture at the opposing distal end thereof. The second spring 60 is connected to the aperture of the return bar 62, and the hook of the return bar 62 is attached to the upper end of the push arm 30. The hook connecting member of the return bar 62 allows the return bar 62 to remain in continuous attachment to the push arm 30 as the push arm is rotatable about the first pivot aperture 34. The return assembly 28 is configured to bias the upper end of the push arm 30 and the corresponding lap bar 12 into the laterally outward neutral position.

In operation, the lap bar 12 is laterally rotatable between an neutral position in which the parking brake system 20 is engaged (FIG. 5) and a steerable position in which the parking brake system 20 is disengaged (FIG. 4). As the lap bar 12 rotates laterally outward toward the neutral position, the upper end of the push arm 30 rotates laterally outward, thereby causing the lower end of the push arm 30 and the projection 42 to rotate inwardly. As the projection 42 extending from the push arm 30 rotates inwardly, the projection 42 contacts the pad 48 of the pedal arm 32, thereby causing the pedal arm 32 to rotate about the second pin 46 from a substantially vertical orientation to an angled orientation relative thereto. The rotation of the pedal 32 from the vertical position to an angled position causes the pedal arm 32 to pull on, or extract, the end of the guide wire 50 attached thereto through the sheath 52. As the guide wire 50 is extracted, the end of the guide wire 50 attached to the first spring 54 pulls the first spring 54 into tension, thereby pulling or otherwise biasing the pawl 58 from the disengaged position into the engaged position. As the pawl 58 is rotated into the engaged position, the teeth of the pawl 58 engage the corresponding teeth of the parking gear 58, thereby causing the axle to which the rear wheel 14 is attached to stop or otherwise be prevented from rotating. Once the axle to which the corresponding rear wheel 14 is attached is prevented from rotating, the parking brake system 20 is engaged.

To disengage the parking brake system 20, the lap bar 12 is moved from the neutral position to the steerable position, which is illustrated in FIG. 4. As the lap bar 12 is moved to the steerable position, the push arm 30 is rotated such that the lower end of the push arm 30 is rotated outwardly away from the pedal arm 32. As the push arm 30 rotates away from the pedal arm 32, the third spring 68 biases the pawl 56 into disengagement from the parking gear 58 such that the upper end of the pawl 56 rotates away from the parking gear 58. This rotation of the upper end of the pawl 56 pulls on the end of the first spring 54 attached to the pawl 56, thereby extracting, or otherwise pulling, the guide wire 50 from the sheath 52 adjacent to the first spring 54. As the guide wire 50 is pulled through the sheath 52, the end of the guide wire 50 attached to the pedal arm 32 pulls on the pedal arm 32 such that the pedal arm 32 rotates toward the substantially vertical position. Once the third spring 68 biases the pawl 56 to the disengaged position, the rotation of the pawl 56 results in the pedal arm 32 contacting the securing bracket 38 such that the pedal arm 32 is in the vertical orientation and the parking brake system 20 is disengaged.

As shown in FIGS. 3-5, a sensor 70 is attached to the securing bracket 38 for sensing the relative position of the pedal arm 32 when in the substantially vertical (or disengaged) position and the angled (or engaged) position. The sensor 70 includes a plunger that is depressed when the parking brake system 20 is engaged (FIG. 5), and the plunger fully extends when the parking brake system 20 is disengaged (FIG. 4). A sensor 70 is attached to each opposing securing bracket 38 such that each sensor 70 senses the engagement/disengagement of the corresponding parking brake system 20. In an embodiment, the sensors 70 are configured such that engagement of both sensors 70—in which both parking brake assemblies 20 are engaged—is required in order to start the lawn maintenance vehicle 10. This ensures that when the lawn maintenance vehicle 10 is started that the rear wheels 14 are braked and prevented from rotating so that the lawn maintenance vehicle 10 cannot move during the starting operation. Also, while the lawn maintenance vehicle 10 is running, if the operator leaves the seat 18 the vehicle will turn off unless both lap bars 12 are rotated outwardly to the neutral position so that the sensors 70 are engaged.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A parking brake system for a lawn maintenance vehicle, the lawn maintenance vehicle including a pair of opposing lap bars for independently controlling movement of a pair of rear wheels, said parking brake system comprising:
    an actuation assembly attached to one of said lap bars, said actuation assembly includes a rotatable push arm and a rotatable pedal arm, said push arm is spaced apart from said pedal arm when said push arm is in a disengaged position and said push arm is in contact with said pedal arm when said push arm is in an engaged position;
    a stop assembly operatively connected to said actuation assembly, said stop assembly including a rotatable pawl selectively engageable with a parking gear, said parking gear operatively connected to an axle to which one of said rear wheels is attached for selectively preventing rotation of said axle; and
    wherein rotation of said push arm from said disengaged position to said engaged position causes said push arm to contact said pedal arm, wherein said pedal arm is rotated in response to said contact with said push arm and such rotation of said pedal arm causes said pawl of said stop assembly to engage said parking gear which prevents rotation of said axle.

2. The parking brake assembly of claim 1 further comprising a transfer assembly operatively connected to said actuation assembly and said stop assembly, said transfer assembly including a guide wire and a first spring, said guide wire extends between said pedal arm and said first spring and said first spring extends between said guide wire and said pawl, wherein rotation of said pedal arm is transferred through said guide wire and said first spring to cause rotation of said pawl into engagement with said parking gear.

3. The parking brake assembly of claim 1 further comprising a return assembly operatively connected to said push arm, said return assembly including a second spring and a return bar, wherein said return bar extends between said push arm and said second spring, and said second spring and return bar biases said push arm into said engaged position.

4. The parking brake assembly of claim 1, wherein the step of wherein rotation of said push arm from said disengaged position to said engaged position is performed manually by an operator.

5. A parking brake system for a lawn maintenance vehicle, the lawn maintenance vehicle including a pair of opposing lap bars for independently controlling movement of a pair of rear wheels, said parking brake system comprising:
a push arm operatively connected to a lower end of each of said lap bars, each of said push arms being movable between a first operative position and a second operative position;
a pedal arm spaced apart from said push arm, wherein said pedal arm is rotatable between a disengaged position and an engaged position in response to contact from said push arm being moved from said first operative position to said second operative position;
a pawl operatively connected to said pedal arm, wherein rotation of said pedal arm from said disengaged position to said engaged position causes said pawl to engage a parking gear which prevents rotation of said pair of rear wheels.

6. The parking brake system of claim 5, wherein movement of each of said push arms from said first operative position to said second operative position is in response to movement of one of said lap bars being rotated laterally outward.

7. The parking brake system of claim 5, wherein each of said push arms is independently movable between said first operative position and said second operative position.

8. The parking brake system of claim 5, wherein said pedal arm is operatively connected to said pawl by way of a wire.

9. The parking brake system of claim 5, wherein said pedal arm is biased toward said disengaged position when said push arms are in said first operative position.

10. The parking brake system of claim 9, wherein said first operative position of said push arms is any position in which said lap bars are being used to control the fore/aft movement of said lawn maintenance vehicle.

11. The parking brake system of claim 5, wherein said pedal arm includes a pad extending outwardly therefrom.

12. The parking brake system of claim 11, wherein said push arm includes a projection extending therefrom, and wherein said projection of said push arm contacts said pad of said pedal arm when said push arm is moved from said first operative position to said second operative position.

* * * * *